United States Patent
Gretz

(10) Patent No.: US 6,629,676 B1
(45) Date of Patent: Oct. 7, 2003

(54) CABLE SUPPORT WITH INTEGRAL BOX-SHAPED MOUNTING ASSEMBLY

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

(21) Appl. No.: 10/281,861

(22) Filed: Oct. 28, 2002

(51) Int. Cl.[7] .............................................. E21F 17/02
(52) U.S. Cl. ........................ 248/58; 348/304; 348/339; 348/68.1
(58) Field of Search ........................ 248/58, 68.1, 63, 248/65, 304, 305, 59, 62, 339

(56) References Cited

U.S. PATENT DOCUMENTS

| | | | |
|---|---|---|---|
| 5,533,696 A | | 7/1996 | Laughlin et al. |
| 5,542,631 A | * | 8/1996 | Bruno .......................... 248/58 |
| 5,553,823 A | * | 9/1996 | Protz, Jr. ..................... 248/304 |
| 5,667,181 A | | 9/1997 | van Leeuwen et al. |
| 5,740,994 A | | 4/1998 | Laughlin |
| 5,961,081 A | * | 10/1999 | Rinderer ..................... 248/68.1 |
| 5,964,434 A | | 10/1999 | Lynch, Jr. |

* cited by examiner

Primary Examiner—Ramon O. Ramirez

(57) ABSTRACT

A one-piece cable support including an integral box-shaped mounting assembly. The box-shaped mounting assembly extends over a cable tray portion of the cable support and includes several optional mounting apertures. Once secured to a building structure through the box-shaped mounting assembly, the weight of a suspended bundle of cables is distributed evenly below the assembly, thereby permitting the load to be balanced evenly below the assembly and reducing the bending moment and therefore the stress on the wall portion connecting the cable tray and mounting assembly portions of the support. An integral bracket assembly is provided on the bottom of the cable support to allow easy ganging of multiple cable supports without the need for specialized brackets.

12 Claims, 5 Drawing Sheets

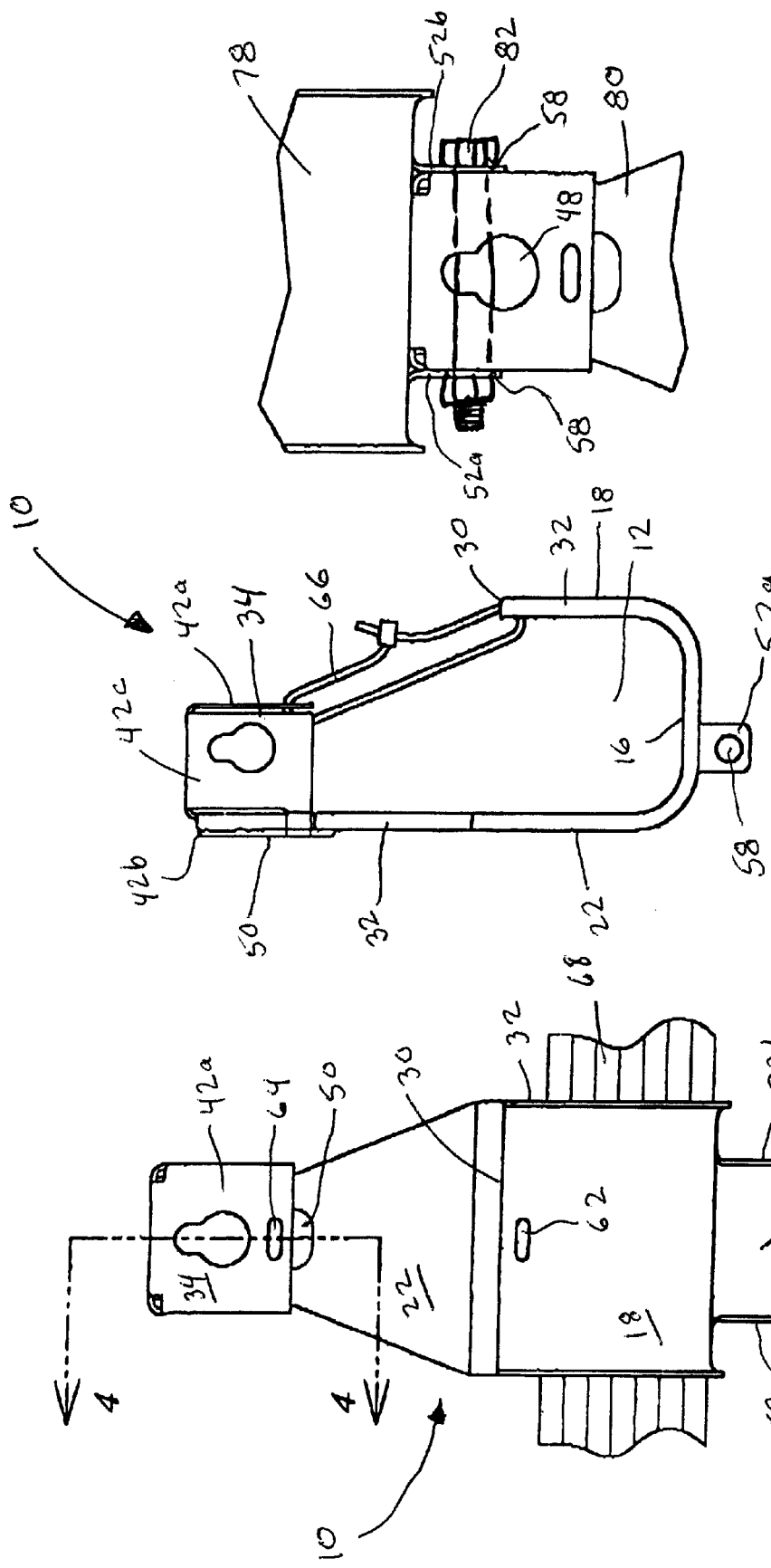

CABLE SUPPORT WITH INTEGRAL BOX-SHAPED MOUNTING ASSEMBLY

FIELD OF THE INVENTION

This invention relates to cable supports for communications cables rated for high data transmission rates and specifically to an improved cable support that simplifies ganging together multiple supports for supporting several bundles of cable.

BACKGROUND OF THE INVENTION

It is common to use high performance electrical telecommunication transmission cable to connect computers, servers, printers, faxes, and other electronic equipment. Unshielded twisted pair (UTP) cable has been developed to meet the high data transmission speeds needed in modern Local Area Networks (LAN). Many LANs today use Category 5 cable, the performance requirements of which are defined by the Electronic Industries Association (EIA) standard TSB-36 for UTP cable.

As data transmission rates increase, to connect various pieces of electronic equipment, it frequently is necessary to route high speed data transmission cable throughout new or existing buildings. Great care is necessary when running UTP cable, as any kinking, sharp bends, or damage to the cable can cause undesirable side effects, such as creation of cross-talk or static between the various conductors.

In new buildings, cable trays are frequently installed. These make it easy to route cable throughout the building as the bend radius of the cables will conform to the bend radius of the trays, and can therefore be controlled. However, routing cable throughout an existing building presents many problems. Frequently, the cable must be routed through an area above a ceiling, such as a building having a drop ceiling. Cable trays are typically not available, and therefore hooks, rings, or similar devices must be used to create a suitable path for laying cable.

Several J-shaped hooks have been proposed for the support of communications cables. Although the prior art J-hooks provide a secure anchor for communications cables, they do not provide a balanced support and evenly distribute the weight of a suspended bundle of cables on the top stem. With a bundle of cables supported from the J-hook, a large bending moment or force is exerted on the stem. Therefore, a bundle of cables suspended in a J-hook may eventually cause the hook material to fatigue and break near the anchoring point, especially when anchored to structures that are susceptible to vibrations, such as air plenums and the like. The prior art J-hooks are also less than optimal when used to support several separate bundles of cables from the same anchoring point. The prior art J-hooks cannot be ganged directly to each other for holding multiple bundles of cables, but rather require the use of a specially designed bracket.

Therefore prior art J-hooks and similar devices have not proved entirely adequate for evenly distributing the suspended weight and for supporting multiple bundles of communications cables. What is needed is a cable support that, when secured to a structure, provides a balanced platform in which no particular part is unduly stressed by a high bending moment. Additionally, what is desired is a cable support that can be ganged to additional cable supports without the need for special brackets.

Therefore, what is needed is a balanced cable support capable of being ganged directly to additional supports for the support of large bundles of communications cables.

OBJECTS OF THE INVENTION

Accordingly, the cable support of the present invention exhibits several advantages over prior art cable supports for communications cables. The cable support is of a design that insures a suspended weight will be balanced evenly below the anchoring point. As a result of balancing the suspended weight below the top portion, no excessive bending moment is created to cause fatigue at the anchoring point.

Additionally, the present invention provides a cable support that may easily be ganged directly to additional like cable supports without use of a separate bracket or other piece. This simplifies the task of ganging cable supports and thereby eliminates the need to stock additional parts such as brackets.

When ganged together, the present invention also has the advantage of presenting a balanced column of cable supports. The cable supports link to each other in a manner in which the weight is distributed evenly from the bottommost support to the topmost support. This has the advantage of causing less undue stress to individual portions of the combined tree of supports.

These and other advantages will become obvious by reading the attached detailed description of the present invention along with reference to the drawings and the appended claims.

SUMMARY OF THE INVENTION

The invention is a one-piece cable support having an integral box-shaped mounting assembly. The box-shaped mounting assembly extends over a cable tray portion of the cable support and includes several optional mounting apertures. Once secured to a building structure through the box-shaped assembly, the weight of a suspended bundle of cables is distributed evenly below the box-shaped assembly, thereby permitting the load to be balanced evenly below the assembly and reducing the bending moment and therefore the stress on the wall portion connecting the cable tray and mounting assembly portions of the support. An integral bracket assembly is provided on the bottom of the cable support to allow easy ganging of multiple cable supports without the need for specialized brackets.

DESCRIPTION OF THE DRAWINGS

FIG. 1 is a front elevation view of a preferred embodiment of the cable support according to the present invention including a cable bundle supported therein.

FIG. 2 is a side elevation view of the cable support of FIG. 1.

FIG. 3 is a detailed view of the integral bracket of a first cable support secured to the box-shaped mounting assembly of a second cable support.

FIG. 7 is a perspective view depicting several cable supports according to the present invention ganged together and secured to a structure to support two bundles of cables there between.

Figure 4:
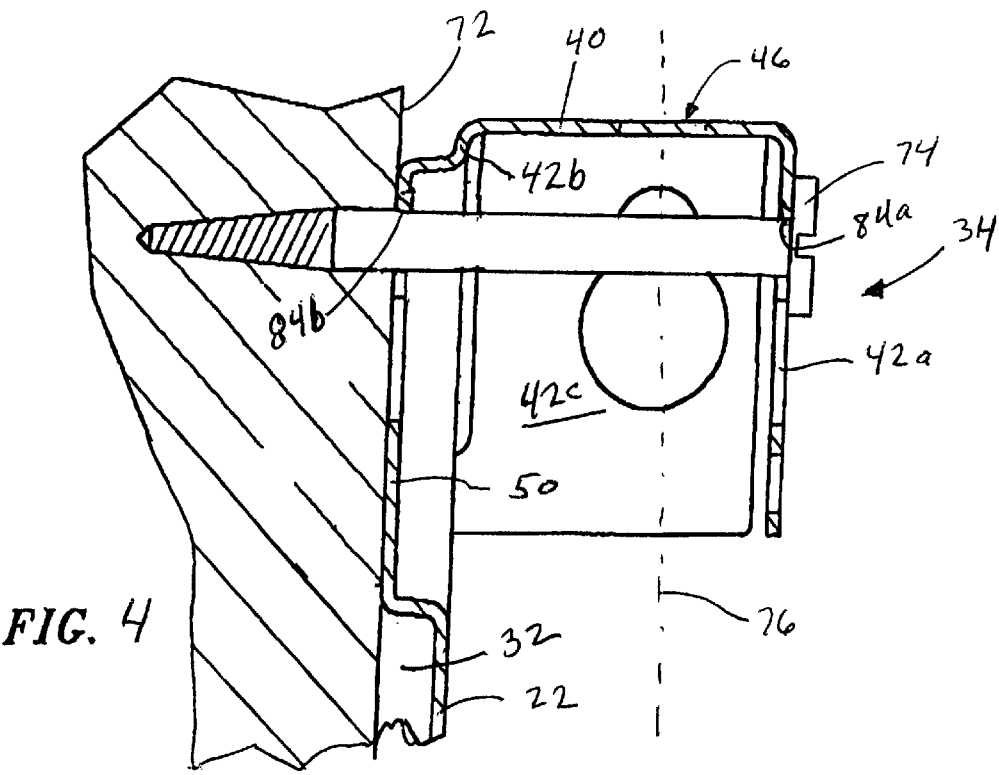
FIG. 4 is a sectional view taken along lines 4—4 of FIG. 1 and depicting the cable support secured to a vertical surface.

| Index to Reference Numerals in Drawings | |
|---|---|
| 10 | cable support |
| 12 | cable tray |
| 14 | edges of cable tray |
| 16 | bottom of cable tray |
| 18 | front wall |
| 20 | first side |
| 22 | rear wall |
| 24 | edges of rear wall |
| 26 | second side |
| 28 | edges of front wall |
| 30 | end of front wall |
| 32 | reinforcing flange |
| 34 | box-shaped mounting assembly |
| 36 | blank |
| 38 | top portion of blank |
| 40 | top wall |
| 42a | front side wall |
| 42b | rear side wall |
| 42c | lateral side wall |
| 42d | lateral side wall |
| 43c | locking tab |
| 43d | locking tab |
| 44 | bend line for side walls |
| 45 | bend line for locking tabs |
| 46 | aperture in top wall |
| 48 | aperture in side walls |
| 50 | raised area |
| 52a | receiving tab |
| 52b | receiving tab |
| 53 | gap |
| 54 | lance line for receiving tab |
| 56 | bend line for receiving tab |
| 58 | aperture in receiving tab |
| 60 | horizontal surface |
| 62 | aperture in front wall of cable support |
| 64 | aperture in front side wall of mounting assembly |
| 66 | cable tie |
| 68 | bundle of cables |
| 70 | fastener |
| 72 | vertical surface |
| 74 | fastener |
| 76 | axis |
| 78 | first cable support |
| 80 | second cable support |
| 82 | fastener |
| 84a | load bearing point |
| 84b | load bearing point |

DETAILED DESCRIPTION OF THE INVENTION

Figure 5:
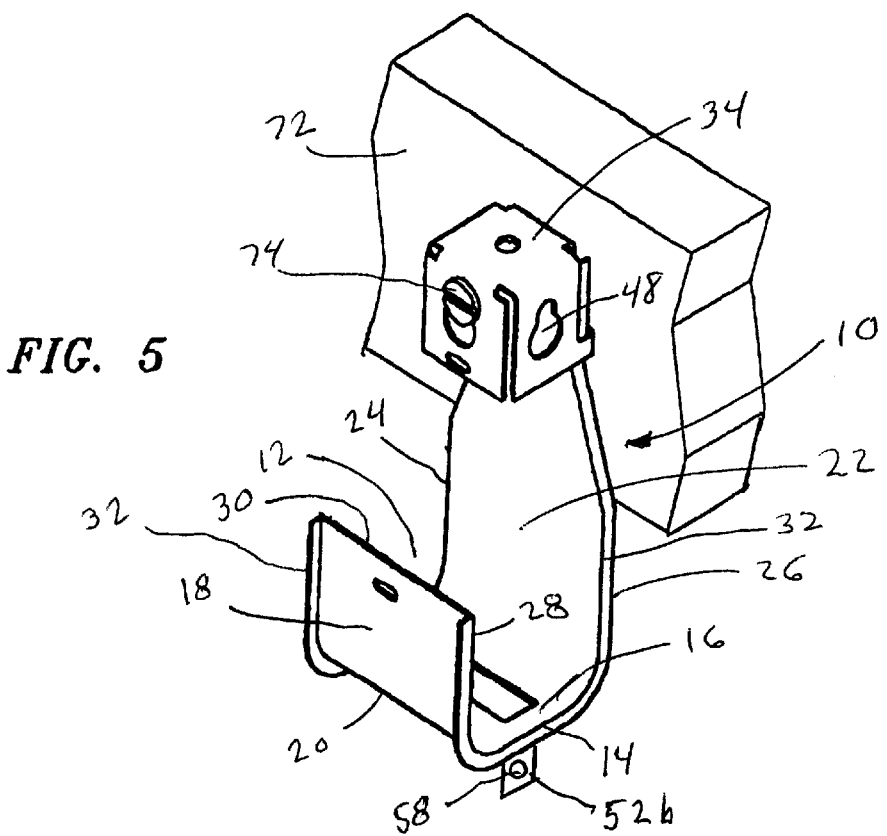
FIG. 5 is a perspective view of the cable support of FIG. 1 secured to a building structure.

Referring to FIG. 5, a one-piece cable support 10 according to the present invention includes a cable tray 12 having edges 14 and a substantially flat bottom 16. A front wall 18 is integral with and extends from a first side 20 and a rear wall 22 including edges 24 extends from a second side 26 of the cable tray 12. The front wall 18 includes edges 28 and an end 30. The rear wall 22 has a constant width at the cable tray 12 but narrows in width as it extends beyond the end 30 of the front wall 18. A reinforcing flange 32 extends around the edges 14, 24, 28 of, respectively, the cable tray 12, rear wall 22, and front wall 18. A box-shaped mounting assembly 34 is integral with and extends from the rear wall 22 and extends substantially over the cable tray 12.

Figure 8:
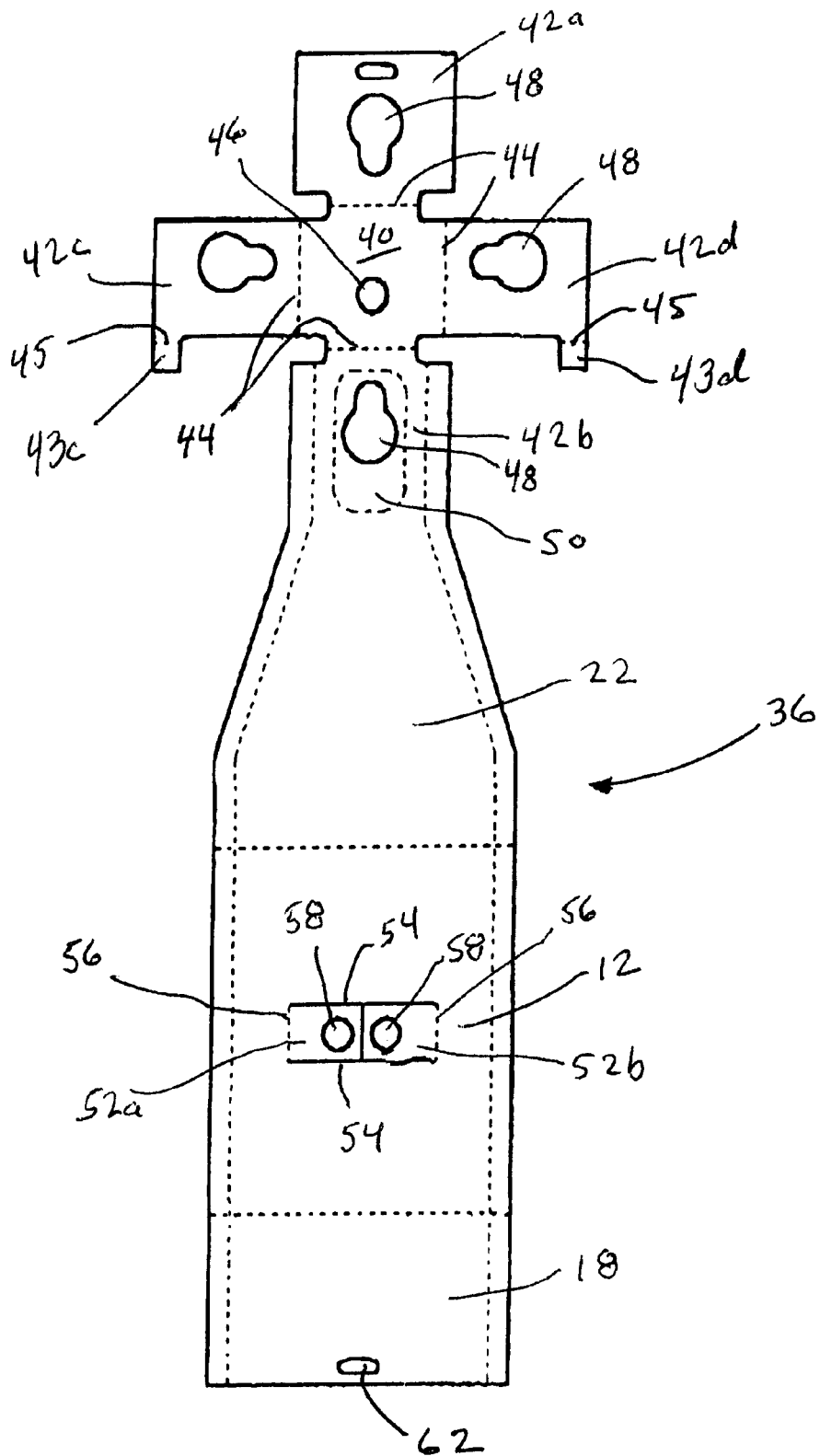
FIG. 8 is a plan view of a blank used to form the cable support of FIG. 1.

A cable support according to the present invention is typically formed from a blank 36 such as that shown in FIG. 8. The dashed lines denote the locations where the blank 36 will be bent to form the cable support. The portions of the blank 36 that will become the cable tray 12, front wall 18, and rear wall 22 are denoted on the figure. The top portion 38 of the blank 36 includes a top wall 40 and side walls 42a, 42b, 42c, 42d, that will be bent along the dashed bend lines 44 to form the box-shaped mounting assembly 34. The side walls include a front side wall 42a, rear side wall 42b, and two lateral side walls 42c and 42d. An aperture 46 is included in the top wall 40 and apertures 48 are included in each side wall 42a, 42b, 42c, and 42d. Locking tabs 43c, 43d are included on each lateral side wall 42c, 42d and include bend lines 45. The locking tabs 43c, 43d will be bent along lines 45 after the top wall 40 and the lateral side walls 42c, 42d are bent along lines 44 to lock the lateral side walls to the rear wall 22 to enhance the structural integrity of the cable support. The apertures 48 in the side walls are typically keyhole-shaped apertures as shown. The rear side wall 42b is an integral coplanar portion of the rear wall 22 of the cable support except for a raised area 50 that surrounds the aperture 48 in the rear side wall 42b. Receiving tabs 52a, 52b will be lanced out of the blank 36 in the bottom 16 of the cable tray 12 in the positions indicated by lance lines 54 and bent outwards of the cable tray 12 at the bend lines 56. An aperture 58 is provided in each receiving tab 52a, 52b.

After the blank is formed into a cable support 10, as shown in FIGS. 1 and 2, the cable support consists of the cable tray 12 with a substantially flat bottom 16 and a reinforcing flange 32 along the edges of the cable tray 12, front wall 18 and rear wall 22. The front side wall 42a extends substantially over the cable tray 12 and along with the rear side wall 42b and remaining side walls 42c, 42d forms a box-shaped mounting assembly 34. The receiving tabs 52a, 52b extend below the cable tray bottom 16 and form a gap 53 there between.

As shown in FIG. 4, the rear side wall 42b includes a raised area 50 that extends substantially as far as the reinforcing flange 32 so that placement of the rear wall 22 against the vertical surface 72 of a building structure will enable the reinforcing flange 32 and raised area 50 to both seat flush against the vertical surface 72.

With reference to FIGS. 1 and 2, the end 30 of the front wall 18 includes an aperture 62 and the front side wall 42a of the box-shaped mounting assembly 34 includes an aperture 64. Apertures 62 and 64 are capable of receiving a cable tie 66 such as that shown in FIG. 2 for restraining a bundle of cables (not shown) within the cable support 10. As shown in the side view of FIG. 2, the apertures 58 in the receiving tabs 52a, 52b are coaxial for later acceptance of a fastener (not shown) there through.

Figure 9:
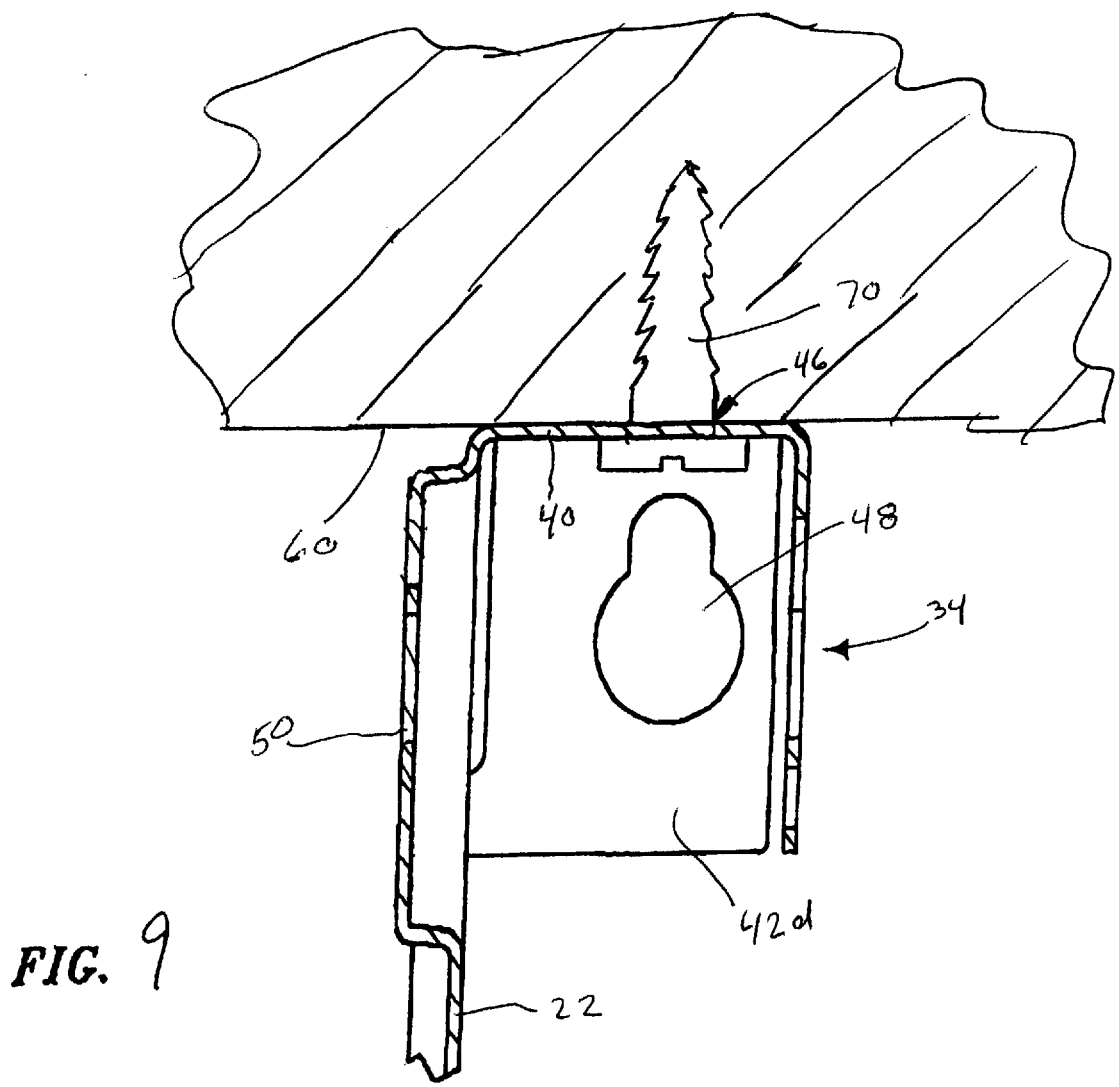
FIG. 9 is a sectional view of the top portion of the cable support of FIG. 1 depicting the cable support secured to a horizontal surface.

Once secured to an overhead horizontal surface 60 by a fastener 70 through the aperture 46 in the top wall 40 of the box-shaped mounting assembly 34, such as shown in FIG. 9, the weight of a suspended bundle of cables (not shown) is distributed evenly below the box-shaped assembly 34, thereby permitting the load to be balanced evenly below the assembly and reducing the bending moment and therefore the stress on the rear wall 22 connecting the cable tray 12 and mounting assembly 34 portions of the cable support 10.

An alternative method of securing the cable support 10 is shown in FIG. 4, in which the box-shaped mounting assembly 34 is secured to a vertical surface 72 by a fastener 74 inserted through parallel side walls, such as the front side wall 42a and the raised area 50 in the rear side wall 42b. Alternatively, the cable support 10 may be mounted with any of the side walls 42a, 42b, 42c, and 42d mounted flush against the vertical surface 72 by simply rotating the cable support 10 such that the desired side wall is against the surface and then securing a fastener through the side walls parallel to the vertical surface. As shown in FIG. 4, since the side walls are equidistant around the balance point, which is along a central axis 76 through the aperture 46 in the top wall 40 as shown, the weight of the cable support 10 and any supported bundles of cables (not shown) will bear evenly on both sides of the fastener 74 at the load bearing points 84a, 84b where the side walls 42a, 42b contact the fastener.

Thus, whether secured by a fastener 70 inserted through the aperture 46 in the top wall 40 of the mounting assembly 34 into a horizontal surface 60, such as shown in FIG. 9, or a fastener 74 inserted through the coaxial apertures 48 in any two of the side walls 42a, 42b of the mounting assembly 34 into a vertical surface 72, as shown in FIG. 4, the weight of the cable support 10 and any supported cables will be balanced around the box-shaped mounting assembly 34 on the top of the cable support 10.

Figure 6:
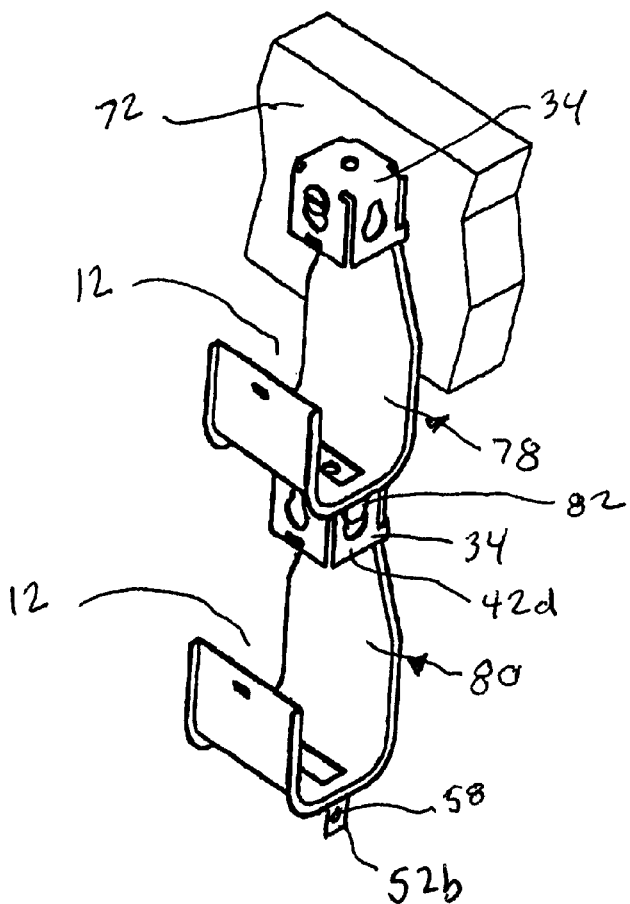
FIG. 6 is a perspective view of two cable supports according to the present invention with a first cable support secured to a building structure and a second cable support secured to the first cable support.
Figure 7:
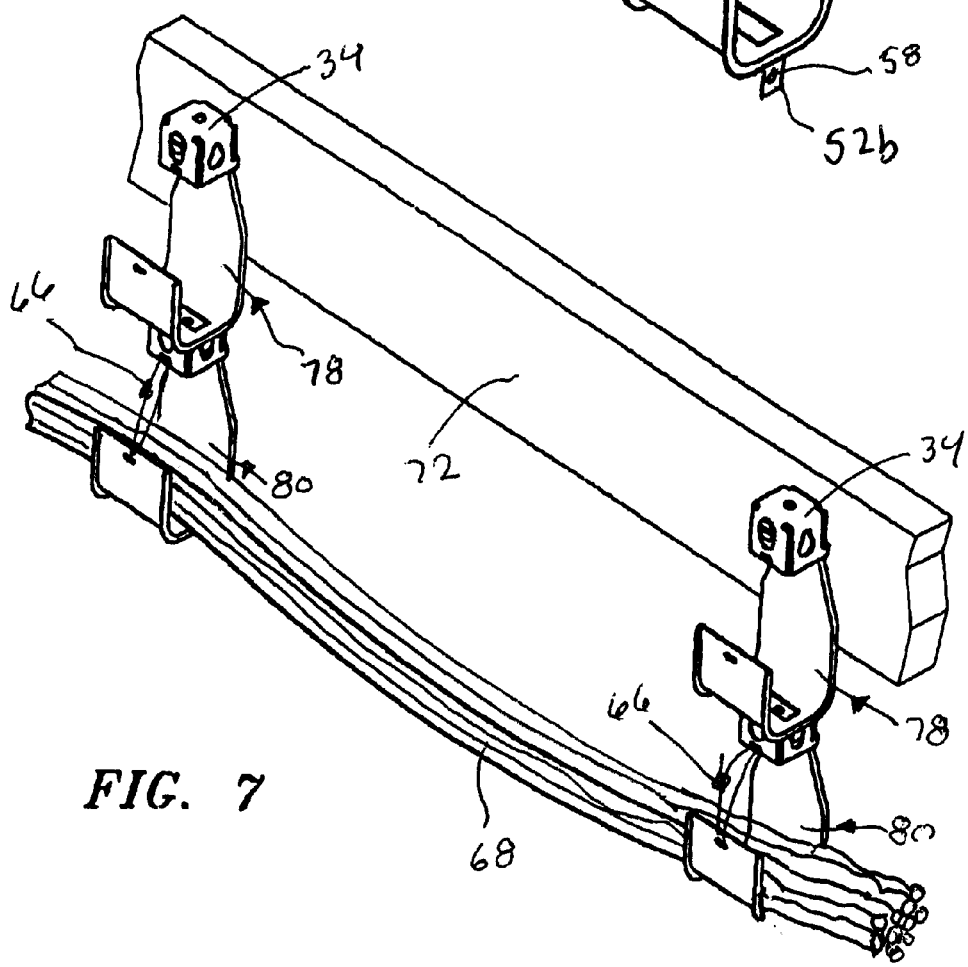

FIGS. 3, 6, and 7 highlight an additional feature of the cable support 10 with integral box-shaped mounting assembly 34 according to the present invention, which is the ability to gang multiple connectors vertically in order to support multiple bundles of cables. As shown in FIG. 3, a first cable support 78 may be mounted vertically to a supporting surface (not shown) and a second cable support 80 may be mounted to the first cable support 78 by inserting the box-shaped mounting assembly 34 of the second cable support 80 into the gap 53 between the receiving tabs 52a, 52b of the first cable support 78. A fastener 82 can then be secured through the coaxial apertures 58 in the receiving tabs 52a, 52b and the coaxial apertures 48 in opposing side walls 42c, 42d to secure the second cable support 80 to the first cable support 78. The cable supports 78, 80 will then be secured to a vertical surface 72 and to each other such as shown in FIG. 6. Multiple sets of cable supports according to the present invention can then be spaced at appropriate distances along a supporting surface, such as shown in FIG. 7, to provide proper support for bundles of cables 68. The cable supports should be spaced a selected distance apart in order to minimize cable sag and meet electrical code requirements for cable support spacing and cable sag according to local electrical codes.

It should be easily recognized by the above detailed description that the cable support of the present invention exhibits several advantages over prior art J-hook type cable supports for communications cables. A cable support according to the present invention insures that a suspended weight will be balanced evenly below the anchoring point. As a result of balancing the suspended weight below the anchoring point, no excessive bending moment is created to cause fatigue to the support.

Additionally, the present invention provides a cable support that may easily be ganged directly to additional like cable supports without use of a separate bracket or other device. This simplifies the task of ganging cable supports and thereby eliminates the need to stock additional parts such as brackets.

When ganged together, the present invention also has the advantage of presenting a balanced column of cable supports. The cable supports link to each other in a manner in which the weight is distributed evenly from the bottommost support to the topmost support. This has the advantage of causing less undue stress to individual portions of the combined column of supports.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. A cable support comprising:
   a cable tray including edges and a substantially flat bottom;
   a front wall integral with and extending from a first side of said tray, said front wall having edges and an end;
   a rear wall integral with and extending from a second side of said tray parallel to said front wall, said rear wall extending substantially beyond said end of said front wall, said rear wall narrowing beyond said end of said front wall, said rear wall including edges;
   a reinforcing flange on said edges of said cable tray, said front wall, and said rear wall, said reinforcing flange extending outwards of said cable tray and said walls, said flange having an outer end;
   a box-shaped mounting assembly integral with said rear wall and extending substantially above said cable tray, said assembly including a top wall and side walls, said side walls including a front and a rear side wall, said front side wall terminating in an end facing said cable tray;
   an aperture in each of said side walls;
   a raised area surrounding said aperture in said rear side walls, said raised area extending substantially as far as said outer end of said reinforcing flange;
   receiving tabs lanced out of said bottom, said tabs extending outwardly from said cable tray, said tabs parallel to each other and forming a gap there between, said gap slightly larger than the distance across the outer surface of said side walls of said mounting assembly; and
   an aperture in each of said tabs, said apertures in said tabs aligning with two of said apertures in said side walls of said mounting assembly to allow easy connection of two or more of said cable supports by a suitable fastener fastened between said apertures in said tabs of a first cable support and said apertures in said side walls of said mounting assembly of a second cable support.

2. The cable support of claim 1 wherein
   said end of said front wall of said cable tray includes an aperture, and
   said end of said front side of said mounting assembly includes an aperture
   whereby said apertures are capable of receiving a cable tie or similar restraint device there between for restraining a bundle of cables within said cable tray.

3. The cable support of claim 2 wherein said box-shaped mounting assembly extending substantially above said cable tray enables said cable tie to be fastened between said aperture in said front wall of said cable tray and said aperture in said end of said front side of said mounting assembly thereby allowing said bundle to extend substantially beyond said end of said front wall.

4. The cable support of claim 1 wherein said box-shaped assembly of said second cable support is capable of being oriented and fastened within said gap of said first cable support such that an installer may select one of four separate alignments of said first cable support with respect to said second cable support.

5. The cable support of claim 1 wherein mounting of said rear wall of said cable support to a vertical supporting surface enables said raised area and said reinforcing flange to mount substantially flush against said surface.

6. The cable support of claim 1 wherein said top wall of said mounting assembly is substantially flat and includes an aperture therein to is permit substantially flush mounting of said top wall to an overhead horizontal supporting surface by a fastener inserted through said aperture in said top wall and into said surface.

7. The cable support of claim 6 wherein said cable support is typically positioned vertically with said mounting assembly above said cable tray.

8. The cable support of claim 7 wherein said cable support positioned vertically is balanced around a vertical axis through said aperture in said top wall, thereby distributing weight of said cable tray and a cable bundle inserted therein evenly around said fastener.

9. The cable support of claim 8 wherein two or more of said cable supports may be connected to form a vertical column of cable supports with said column of cable supports balanced around said vertical axes in each of said cable supports.

10. A method of suspending multiple levels of cable bundles comprising the steps of:
   providing a plurality of-cable supports with each of said cable supports having a cable tray including a bottom, an integral box-shaped mounting assembly having side walls extending substantially above said cable tray, and receiving tabs extending outwardly and downwardly from said bottom of said cable tray and forming a gap there between;
   providing an aperture in each of said side walls and an aperture in each of said tabs with said apertures positioned such that insertion of said side walls of said assembly into said gap enables alignment of said apertures in said side walls and said apertures in said tabs;
   securing a first of said cable supports to a supporting structure by a fastener inserted through said apertures in said mounting assembly and into said structure;
   rotating a second of said cable supports with respect to said first cable support such that the desired alignment is reached between said second and said first cable support;
   inserting said side walls of said second cable support within said gap between said tabs of said first cable support; and
   inserting and securing a fastener within said apertures in said side walls of said bottom cable support and said apertures in said tabs of said top cable support.

11. A cable support comprising:
   a cable tray including edges and a substantially flat bottom;
   a front wall integral with and extending from a first side of said tray, said front wall having edges and an end;
   a rear wall integral with and extending from a second side of said tray parallel to said front wall said rear wall extending substantially beyond said end of said front wall, said rear wall narrowing beyond said end of said front wall, said rear wall including edges;
   a reinforcing flange on said edges of said cable tray, said front wall, and said rear wall, said reinforcing flange extending outwards of said cable tray and said walls, said flange having an outer end;
   a box-shaped mounting assembly integral with said rear wall and extending substantially above said cable tray, said assembly including a top wall and side walls, said side walls including a front and a rear side wall, said front side wall terminating in an end facing said cable tray;
   an aperture in each of said side walls;
   receiving tabs lanced out of said bottom, said tabs extending outwardly from said cable tray said tabs parallel to each other and forming a gap there between, said gap slightly larger than the distance across the outer surface of said side walls of said mounting assembly; and
   an aperture in each of said tabs, said apertures in said tabs aligning with two of said apertures in said side walls of said mounting assembly to allow easy connection of two or more of said cable supports by a suitable fastener fastened between said apertures in said tabs of a first cable support and said apertures in said side walls of said mounting assembly of a second cable support.

12. The cable support of claim 11 wherein mounting of said rear wall of said cable support to a vertical supporting surface enables said reinforcing flange on said rear wall to mount substantially flush against said surface.

\* \* \* \* \*